United States Patent [19]

Inoue et al.

[11] Patent Number: 5,202,544
[45] Date of Patent: Apr. 13, 1993

[54] METHOD OF MACHINING PLATE MATERIALS WITH A PLASMA CUTTER AND PLASMA TORCH

[75] Inventors: Makoto Inoue, Chigasaki; Kunio Horiai, Hiratsuka; Toshiya Shintani, Kanagawa; Yoshihiro Yamaguchi, Hiratsuka, all of Japan

[73] Assignee: Kabushiki Kaisha Komatsu Seisakusho, Tokyo, Japan

[21] Appl. No.: 543,801

[22] PCT Filed: Oct. 19, 1989

[86] PCT No.: PCT/JP89/01071
§ 371 Date: Jul. 9, 1991
§ 102(e) Date: Jul. 9, 1991

[87] PCT Pub. No.: WO90/04486
PCT Pub. Date: May 3, 1990

[30] Foreign Application Priority Data

Oct. 20, 1988 [JP] Japan .................. 63-265133

[51] Int. Cl.$^5$ .................................... B23K 9/00
[52] U.S. Cl. .................... 219/121.5; 219/123; 219/121.44; 219/121.39
[58] Field of Search .............. 219/123, 121.5, 121.39, 219/129.45, 121.59, 121.52, 76.16

[56] References Cited

U.S. PATENT DOCUMENTS

| | | | |
|---|---|---|---|
| 3,370,148 | 2/1968 | Von Ardenne | 219/75 |
| 3,594,609 | 7/1971 | Vas et al. | 219/123 |
| 4,194,106 | 3/1980 | Rudaz et al. | 219/123 |
| 4,282,418 | 8/1981 | Wuestner | 219/121.5 |
| 4,977,305 | 12/1990 | Severance, Jr. | 219/121.39 |
| 5,036,176 | 7/1991 | Yamaguchi et al. | 219/121.44 |

FOREIGN PATENT DOCUMENTS

| | | |
|---|---|---|
| 58-379 | 1/1983 | Japan . |
| 61-22430 | 1/1986 | Japan . |
| 61-137326 | 6/1986 | Japan . |
| 62-118978 | 5/1987 | Japan . |
| 63-5882 | 1/1988 | Japan . |
| 0011074 | 1/1989 | Japan .................. 219/121.5 |
| 435215 | 10/1967 | Switzerland . |

*Primary Examiner*—Mark H. Paschall
*Attorney, Agent, or Firm*—Richards, Medlock & Andrews

[57] ABSTRACT

The present invention relates to a method of machining plate materials with a plasma cutter and plasma torch. This method is one in which the density of a magnetic flux formed in the range between the vicinity of the surface of an electrode material 3 fixed to the front end of the electrode and the vicinity of the nozzle opening 1b of a nozzle 1 is between 10 and 200 gauss. The magnetic flux is generated by a magnetization apparatus 4 disposed in the vicinity of the electrode 2 of a plasma torch 100. A workpiece 26 is cut by a plasma arc emitted from a nozzle, the diameter d of which is 1.5 mm or less. The plasma torch 100 for use in this method is equipped with a magnetization apparatus 4 in the vicinity of the electrode 2 and the nozzle diameter d is 1.5 mm or less. The above magnetization apparatus 4 is disposed on the same axis as the axis center of the nozzle opening 1b. Thus, even if a voltage drop results from the fact that the nozzle diameter of the plasma torch is made very small, the present invention is free from the double-arc phenomenon and the unstable arc phenomenon, thereby enabling a plasma arc to be stabilized. As a result, stable machining quality and a high-precision machined shape can be obtained.

16 Claims, 4 Drawing Sheets

METHOD OF MACHINING PLATE MATERIALS WITH A PLASMA CUTTER AND PLASMA TORCH

TECHNICAL FIELD

The present invention relates to a method of machining plate materials with a plasma cutter for cutting workpieces using a stable plasma arc and to improvements in a plasma torch.

BACKGROUND ART

In a method of cutting metals or non-metals with high precision, a plasma cutter is widely used. An example of the structure of a conventional plasma torch used in a plasma cutter is shown in FIG. 5. A disc or cylindrical material 21 (hereinafter referred to as an electrode material) for resisting wear at high temperature composed of hafnium, tungsten or the like, is buried in the front end of a water cooling type copper-bar electrode 20. In this example of a swirl flow type plasma cutter, the front end of a nozzle 22 is formed in the form of a funnel. This arrangement is a simple means for fixing an arc to the electrode material 21 on the arc axis center in a case where the front end shape of the electrode 20 is flat. A swirl air flow 24 is generated by the funnel-like nozzle 22. An arc column 25 which causes a powerful thermal pinch effect is formed and the directivity of a plasma arc is maintained, thus cutting a workpiece 26. The smaller the nozzle diameter d is, the greater the thermal pinch effect will become. Further, since a pressure several times greater than the atmospheric pressure is distributed inside the arc column 25, this acts to return the pressure to the same pressure as the atmospheric pressure after it is emitted from the nozzle 22. As a result, the arc column 25 has a tendency to be diffused rather than converged.

Regarding a practical machine of a plasma cutter, a voltage of 100 V or thereabouts can be applied in a manual cutting machine and a high voltage of about 200 V can be applied in a high-speed automatic cutting machine. A high arc voltage in such a plasma cutter causes a thermal pinch effect to the arc column 25, whereas, in the nozzle 22, the resistance of a plasma air flow increases because of the smallness of the nozzle opening diameter d, giving rise to a phenomenon that a voltage drop becomes greater. Therefore, if the nozzle opening diameter d of the nozzle 22 is made too small, a voltage drop occurs and the current also decreases, with the result that a plurality of arc columns are generated which reach a workpiece 26 via a section other than the nozzle opening from the electrode 20 in a form in which arc columns coexist with the arc column 25 passing through the nozzle opening of the nozzle 22. FIG. 8 shows the generation of this double-arc phenomenon. In addition, the directivity of the arc column 25 is no longer maintained, resulting in an unstable arc phenomenon such that the arc column 25 swings.

As regards the stable conditions of a plasma arc, an example, in which the ratio of the diameter d of the nozzle opening of the nozzle 22 to the axial length h of the nozzle opening (nozzle constraint ratio h/d) is defined as a general standard value $h/d \approx 2$, is shown in FIG. 6. It will be understood from this figure that when the nozzle opening diameter d is about 1.5 mm, or smaller, a stable arc generation region (a) almost disappears and becomes either one region of a double-arc generation region (b) or an unstable arc generation region (c). The generation of a plasma arc under these conditions causes a double-arc phenomenon and an unstable arc phenomenon, and therefore the shape of a machined surface of a workpiece and the precision with which the surface of the workpiece is machined deteriorated.

As shown in FIG. 7, regarding the shape of a cut section 27 of a workpiece 26, properly speaking, it must be machined so that D=Da, namely, $\Theta = 90°$ (where D is the machined width in the upper end section of the machined surface 27; Da is the machined width in the lower end section of the machined surface 27; and $\Theta$ is the angle between the machined surface 27 and its upper end surface). However, because of the above-mentioned double-arc phenomenon or the unstable arc phenomenon, a defective machining such that D>Da or D<Da, or $\Theta > 90°$ or $\Theta < 90°$ is caused. Further, a problem also arises in that the service lifetime of the electrode material 21 decreases due to the swing of the arc column 25 or the like.

A measure has also been proposed in which a magnetic field is made to act on a plasma arc and this is converged (for example, please refer to Japanese Patent Publication No. 62-18978). However, the relationship between the strength of a magnetic field and a nozzle diameter, and machining quality has not been solved, and thus the double-arc phenomenon or the unstable arc phenomenon cannot be prevented and it is therefore difficult to put the above proposed measure into practical use. The present invention has been devised in light of the above-mentioned circumstances. Accordingly, it is an object of the present invention to provide a method of machining plate materials with a plasma cutter which cuts a workpiece using a stable plasma arc and a plasma torch.

SUMMARY OF THE INVENTION

In the method of machining plate materials with a plasma cutter and plasma torch of the present invention, by taking note of the fact that if a magnetic field is formed in a plasma state in which gas is dissociated into cations and electrons, the charged particles in the arc column are stabilized without being diffused if within a certain magnetic field intensity, in an arc column passing through the opening of a nozzle, a magnetization apparatus is provided inside the plasma torch of a plasma cutter so as to stabilize the arc column. That is, this method is one in which the density of a magnetic flux formed in the space between the vicinity of the surface of an electrode material fixed to the front end of the electrode and the vicinity of the opening of a nozzle is in the range of 10 to 200 gauss. The magnetic flux is formed by a magnetization apparatus disposed in the vicinity of the electrode of a plasma torch, and a workpiece is cut by a plasma arc emitted from a nozzle opening, the diameter of which is 1.5 mm or smaller. The plasma torch for use in this method is equipped with a magnetization apparatus in the vicinity of its electrode and the diameter of the nozzle opening is 1.5 mm or smaller. The above magnetization apparatus is disposed on the same axis as the axis center of the nozzle opening.

Since a magnetization apparatus is provided so as to form a magnetic field that satisfies the above-mentioned conditions, even if a voltage drop results from the fact that the nozzle diameter of the plasma torch is made very small, the present invention is free from the double-arc phenomenon and the unstable arc phenomenon, thereby enabling a plasma arc to be stabilized. As a result, stable machining quality and a high-precision machined shape can be obtained.

THE BEST MODE FOR CARRYING OUT THE INVENTION

Figure 1:
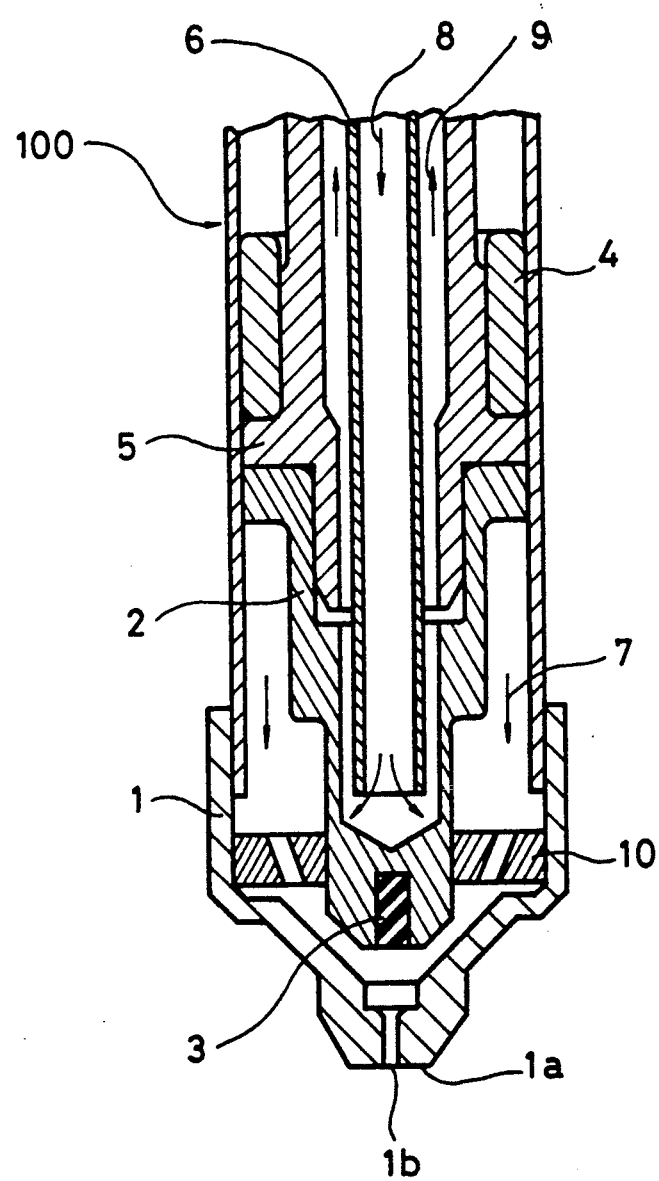
FIG. 1 is a cross-sectional view of a plasma torch of the present invention.

FIG. 1 is a cross-sectional view of a plasma torch of the present invention. A plasma torch 100 has an electrode (negative electrode) 2 contained in it, and in the front end of which is buried an electrode material 3 composed of hafnium, zirconium or the like. The electrode 2 is engaged with a torch main body 5 and can be replaced releasably with the main body 5 when the electrode material 3 is used up. A ring-like magnetization apparatus 4 is releasably disposed. The magnetization apparatus 4 may be made of a permanent magnet or an electromagnet. Its shape may be other than a ring shape and its number of pieces may be two or more. The magnetization apparatus 4 is disposed on the same axis as the center axis of the nozzle opening 1b of a nozzle 1. The nozzle opening 1b is formed in the form of a funnel so that after working gas 7 is added with a swirl speed by a swirler 10, it becomes a swirl flow. Because the plasma torch 100 is exposed to high temperatures, the electrode 2 and the torch main body 5 are each formed with voids. A cooling water pipe 6 is disposed in the voids and the electrode 2 and the torch main body 5 are cooled by cooling water 8 and 9.

In the construction of such a plasma torch, the present inventors have studied the design and layout of a magnetization apparatus that takes into account the stability of a plasma arc and have succeeded in finding a certain technical rule of thumb based upon experiments over long periods of time. The details of it will be explained below.

Figure 2:
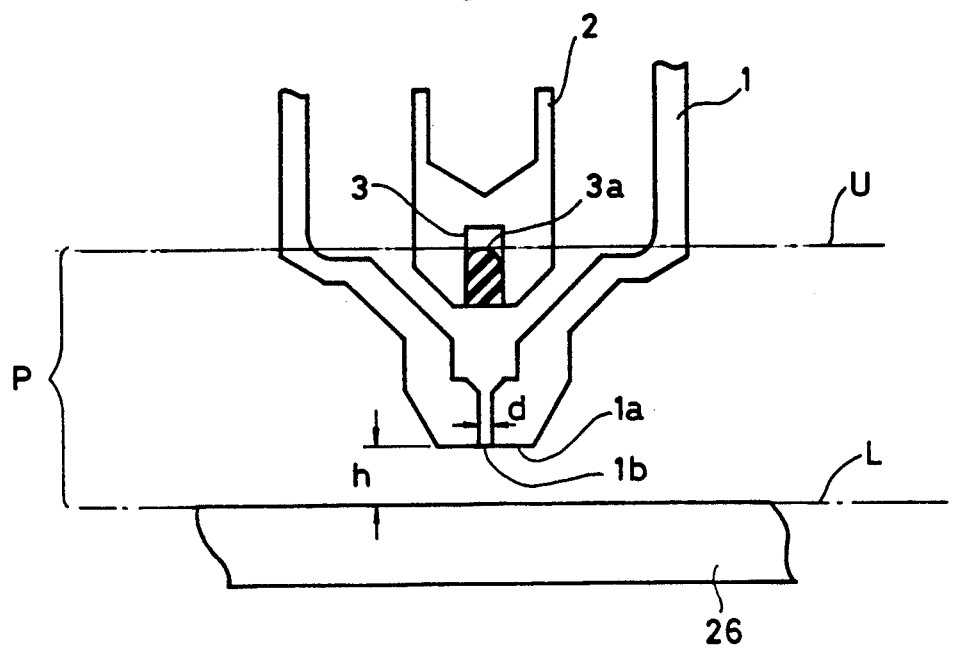
FIG. 2 is a view showing the range of the magnetic-flux density of the front end of the plasma torch of the present invention and a workpiece.
Figure 5:
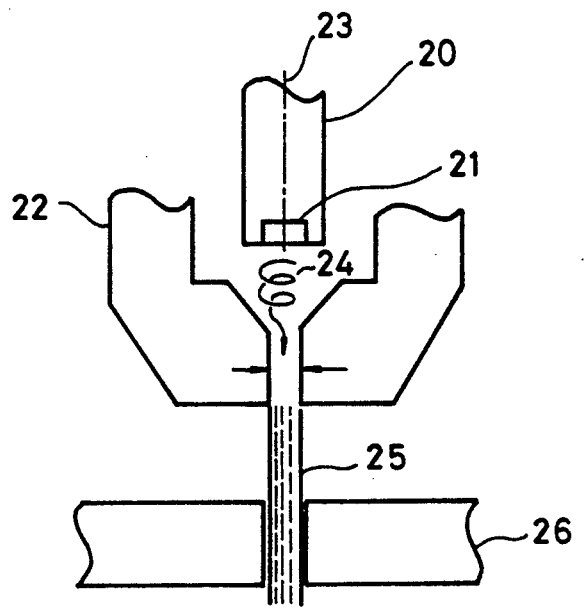
FIG. 5 is an explanatory view of cutting using a conventional plasma torch.
Figure 6:
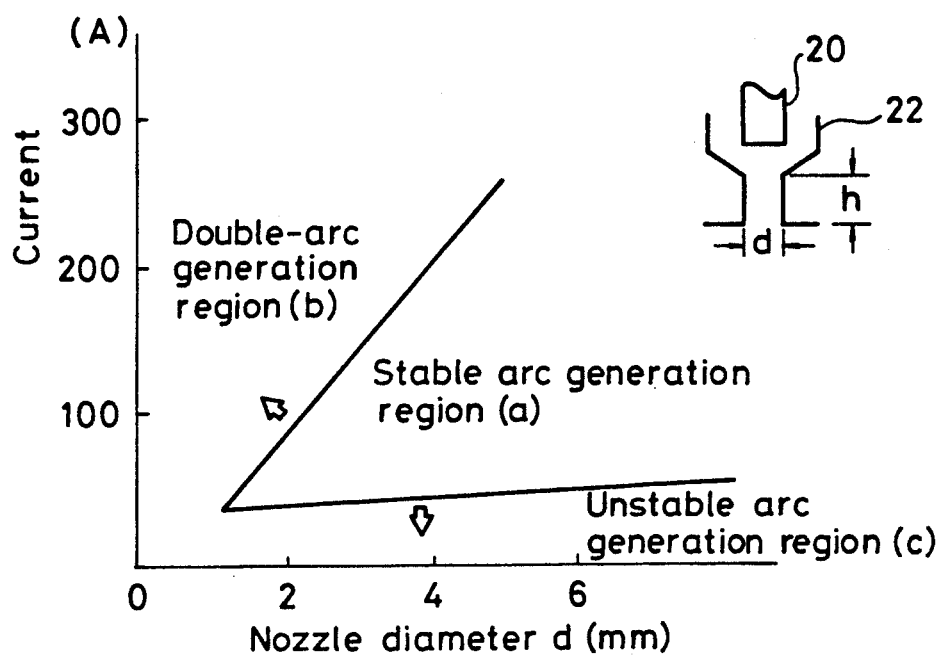
FIG. 6 is a chart showing the conditions for generating a plasma torch arc.

We have found that a conventional disadvantage such that a stable arc cannot be obtained if the nozzle diameter d is 1.5 mm or smaller, as has already been explained in FIG. 6, can be eliminated under the condition that 10- to 200 gauss magnetic flux density of a magnetic field given by the magnetization apparatus 4 disposed on the torch main body 5 shown in FIG. 5 can be obtained in the space between the vicinity of the electrode material 3 buried in the electrode 2, as shown in FIG. 2, (to be accurate, this refers to the upper limit U when a plasma arc is ignited by the electrode material 3 and therefore the electrode material 3 is consumed as a concave surface 3a, this being consumed to the degree such that the electrode 2 is to be replaced) and the vicinity (to be accurate, this refers to the lower limit L to which the height h of the torch is added, because the torch height h is set at several mm from the front end surface 1a to the machining surface of the workpiece 26) of the front end surface 1a of the nozzle 1.

EXAMPLE

In a plasma cutter for practical use, the applied voltage was 110 V; the current was 39A; the electrode 3 was a cylinder having a diameter of 1.6 mm and a length of 3 mm. For the magnetization apparatus 4, an annular permanent magnet having a magnetic flux density of one thousand and several hundreds of gauss was placed on the torch main body 5 which exits at a suitable position from the front end surface 1a of the nozzle 1. The nozzle diameter d was 0.6 mm; the torch height h was 1 mm; the workpiece 26 was rolled steel (SS material) for general construction, and a plate, 3.2 mm thick, was cut. The results of the cutting by varying the magnetic flux density within the region P shown in FIG. 2 at this time are contained in the charts shown in FIGS. 3 and 4.

Figure 3:
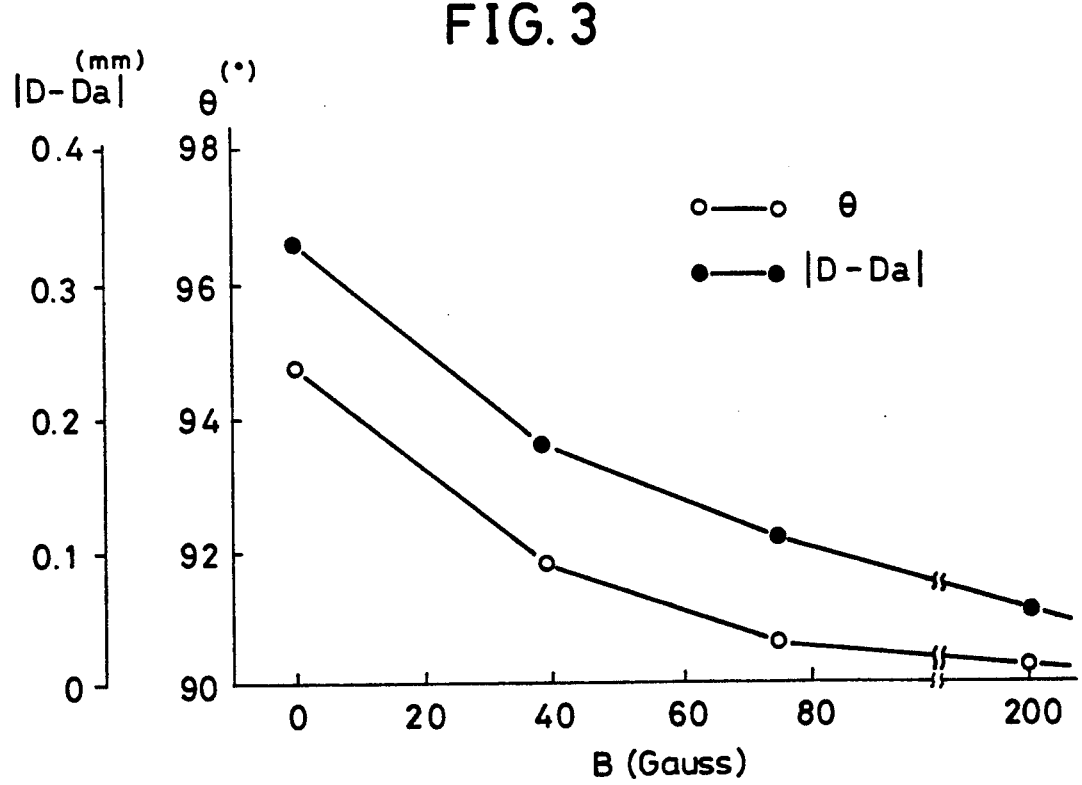
FIGS. 3 and 4 are charts illustrating the magnetic-flux density, machining width, angle and the number of arc generations of the embodiment of the present invention.
Figure 4:
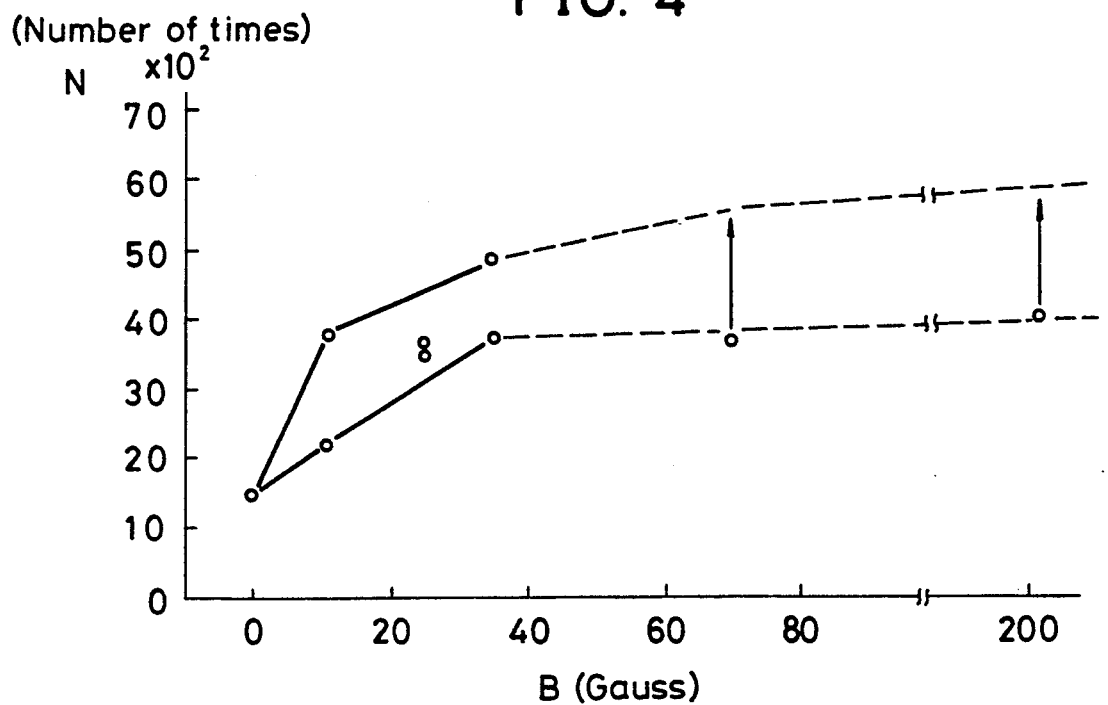
Figure 7:
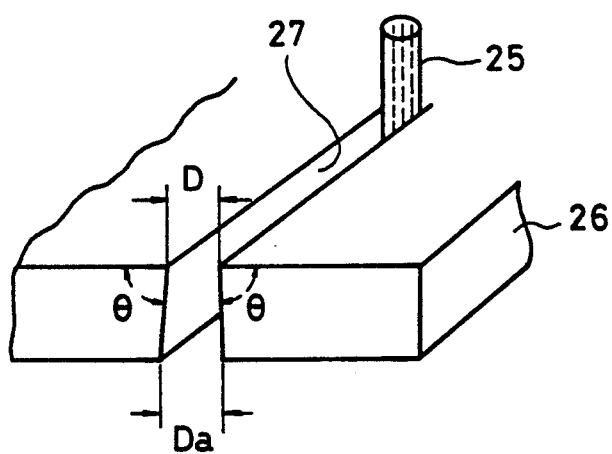
FIG. 7 is a perspective view illustrating the machined shape of a workpiece.
Figure 8:
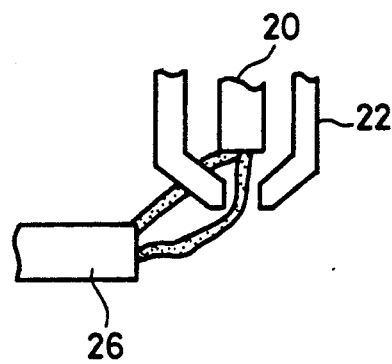
FIG. 8 is an illustration of the generation of a conventional plasma torch double-arc.

In FIG. 3, the horizontal axis B represents magnetic flux density; the vertical axis Θ represents the angle of the workpiece shown in FIG. 7, meaning that as Θ nears 90°, a uniform converged state of a plasma arc is maintained and the precision of a machined shape is better. Another vertical axis |D−Da| represents the difference between the machining widths D and Da in the upper and lower sections of the machined surface 27 of the workpiece 26 shown in FIG. 7, meaning that as |D−Da| nears zero, the plasma arc becomes stabilized and a uniform thermal pinch effect is brought about. As will be understood from the chart, the more the magnetic flux density B within the region P increases, the more Θ nears 90° and |D−Da| nears zero. When the magnetic flux density B exceeds 200 gauss, the magnetic flux that acts on an arc becomes too strong and a convergence cannot be achieved. In FIG. 4, the horizontal axis B represents magnetic flux density and the vertical axis B represents the number of times that arcs ignited by the electrode material 3 are generated stably, meaning that the increase and decrease in the number of arc ignitions is taken to be the fluctuations of the durability of the plasma torch. As will be understood from the chart, when the magnetic flux density B is 0, i.e., when the magnetization apparatus 4 is not mounted, the durability of the plasma torch is low. However, when the magnetization apparatus 4 is mounted and the magnetic flux density B within the region P is increased, the durability of the plasma torch is also increased. The arrows on the data of 70 and 200 gauss mean that the plasma torch is only slightly consumed after 3400 to 4000 arcs are ignited. The test was ended after this number of times and the plasma torch can satisfactorily be used for more than this number of times.

As set forth hereinabove, the present inventors have found from the results of experiments over a long time that if the magnetic flux density B within the double arc region or the unstable region P is between 10 and 200 gauss, a plasma arc is stabilized and convergence is high even under the conditions that the nozzle diameter d of the nozzle 1 is 1.5 mm or smaller and the current is one hundred and several tens of amperes.

The conditions under which a plasma arc is most stabilized are with a nozzle diameter d of 0.2 to 1.5 mm and a current of 20 to 80 amperes. The most suitable magnetic flux density is 20 to 100 gauss when rolled steel for general construction, a stainless steel material or the like, several mm thick, is being cut, although it depends upon the material and thickness of the workpiece.

INDUSTRIAL APPLICABILITY

As has been explained, according to the present invention, a stable arc is generated and the convergence of arcs that brings about a uniform thermal pinch effect can be obtained. In addition, the lifetime of the electrode material is lengthened and the present invention is useful for a method of machining plate materials with a plasma cutter and plasma torch even when the electrode material is consumed. As a result, a workpiece can be cut with precision and excellent machining quality can be obtained.

We claim:

1. A method of machining a workpiece with a plasma torch having a main body, said main body having a front end facing said workpiece, a nozzle having a nozzle opening, the diameter of said nozzle opening being 1.5 mm or less, said nozzle opening having an axis extending therethrough, said nozzle being disposed on the front end of said main body to direct a plasma arc column toward said workpiece, and an electrode disposed within said plasma torch and engaged with said main body and having an electrode material facing said nozzle opening, said method comprising:

emitting a plasma arc through said nozzle opening to produce a plasma arc column of charged particles extending between said nozzle opening and said workpiece with a current of less than one hundred and several tens of amperes to cut the workpiece while utilizing a magnet to maintain a magnetic flux between the vicinity of a surface of said electrode material and the vicinity of said nozzle opening, said magnetic flux having a magnetic flux density in the range of 10 to 200 gauss so that the charged particles in said plasma arc column are stabilized in a uniform converged state without being diffused and so that the double-arc phenomenon is avoided.

2. A method in accordance with claim 1 wherein the diameter of said nozzle opening is in the range of 0.2 mm to 1.5 mm and said current is in the range of 20 to 80 amperes.

3. A method in accordance with claim 1 wherein the magnet is disposed in the vicinity of said electrode and on the same axis as said nozzle opening.

4. A method in accordance with claim 1 wherein the magnet is an annular permanent magnet.

5. A method in accordance with claim 1 wherein the diameter of said nozzle opening is about 0.6 mm.

6. A method in accordance with claim 1 wherein the magnet comprises a permanent magnet.

7. A method in accordance with claim 6 wherein the diameter of said nozzle opening is in the range of 0.2 mm to 1.5 mm.

8. A method in accordance with claim 7 wherein the magnet is disposed in the vicinity of said electrode and on the same axis as said nozzle opening.

9. A plasma torch comprising a plasma torch main body, said main body having a front end, a nozzle having a nozzle opening for emitting a plasma arc to produce a plasma arc column of charged particles with a current of less than one hundred and several tens of ampere, said nozzle being disposed on the front end of said main body, the diameter of said nozzle opening being 1.5 mm or less, said nozzle opening having an axis extending therethrough, an electrode engaged with said main body and having an electrode material facing said nozzle opening, a magnetization apparatus disposed in the vicinity of said electrode to form a magnetic flux density between the vicinity of a surface of said electrode material and the vicinity of the nozzle opening in the range of 10 to 200 gauss so that the charged particles in said plasma arc column are stabilized in a uniform converged state without being diffused and so that the double-arc phenomenon is avoided.

10. A plasma torch in accordance with claim 9 wherein said magnetization apparatus is disposed on the same axis as said nozzle opening.

11. A plasma torch in accordance with claim 9 wherein the diameter of said nozzle opening is in the range of 0.2 mm to 1.5 mm and said current is in the range of 20 to 80 amperes.

12. A plasma torch in accordance with claim 11 wherein said magnetization apparatus is disposed in the vicinity of said electrode and on the same axis as said nozzle opening.

13. A plasma torch in accordance with claim 12 wherein said magnetization apparatus is an annular permanent magnet.

14. A plasma torch in accordance with claim 9 wherein said magnetization apparatus comprises a permanent magnet.

15. A plasma torch in accordance with claim 14 wherein the diameter of said nozzle opening is in the range of 0.2 mm to 1.5 mm.

16. A plasma torch in accordance with claim 14 wherein the diameter of said nozzle opening is about 0.6 mm.

* * * * *